Patented June 24, 1930

1,765,621

UNITED STATES PATENT OFFICE

WALTER SCHOELLER, OF BERLIN-CHARLOTTENBURG, AND HANS GEORG ALLARDT, OF BERLIN-REINICKENDORF-WEST, GERMANY, ASSIGNORS TO SCHERING-KAHLBAUM A.-G., OF BERLIN, GERMANY

PRODUCTION OF ANÆSTHETICS

No Drawing. Application filed August 18, 1928, Serial No. 300,614, and in Germany August 6, 1927.

Our invention refers to pharmaceutical products and more especially to halogen substituted aminobenzoic acid alkamine esters.

It has been known since the work of Einhorn, Liebig's Annalen der Chemie, volume 371, page 125, that the salts of aminobenzoic acid alkamine esters are particularly valuable anæsthetics.

We have now found that halogen substituted aminobenzoic acid alkamine esters exhibit greater anæsthetic action than the halogen free aminobenzoic acid alkamine esters.

The halogen substituted aminobenzoic acid alkamine esters can be obtained by halogenating an aminobenzoic acid alkamine ester. The reaction is effected without saponification occurring and the products are obtained in good yield. These halogenated aminobenzoic alkamine esters can also be obtained by converting halogen nitro- or halogen aminobenzoic acids by the customary methods into the corresponding aminoalkaline esters.

The new products correspond to the formula

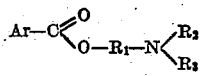

wherein Ar is an amino- and halogen substituted benzene nucleus containing at least one iodine atom, $R_1$ a bivalent alkylene radical, while $R_2$ and $R_3$ are alkylradicals or form together with the nitrogen atom a cyclic system.

The new products are alkaline substances, insoluble in water, soluble in most organic solvents, with acids they form crystallized colourless salts, which are practically insoluble in ether, benzene, chloroform, more easily soluble in alcohol and water and which acting on the organism exhibit an anæsthetic effect.

Example 1

Into a solution of 27 parts of p-aminobenzoyl-diethylamino-ethanol hydrochloride, or the corresponding quantity of the base, in 200 parts of dilute hydrochloric acid is passed with brisk stirring a slow stream of gaseous iodine chloride and care is taken by cooling that the temperature in the reaction vessel does not rise too high. In all, the vapour of 16 parts of iodine chloride is passed in. From the hydrochloric acid solution is precipitated after some time the hydrohalogen acid salt of the diethylamino ethanol ester of mono-iodoaminobenzoic acid as a viscous oil. Stirring is continued for some hours longer after all the iodine chloride is introduced. When the halogenation is complete the reaction mass is carefully rendered alkaline, the base extracted and precipitated from the extract as a salt. The hydrochloric acid salt crystallizes in needles of melting point 176° C.

| Analysis | C | H | N |
|---|---|---|---|
| | Per cent | Per cent | Per cent |
| Calculated | 39.1 | 5 | 7 |
| Found | 38.8 | 5 | 7 |

The hydrochloric salt corresponds probably to the formula

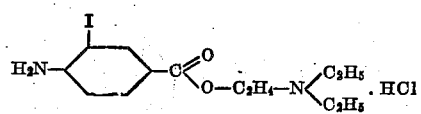

In the same manner the lactate, tartrate, citrate, borate and so on, can be manufactured. The salts are in general almost colourless crystals which are practically insoluble in ether, benzene, chloroform, more easily soluble in alcohol and water. Instead of employing the iodine chloride in the form of gas it can obviously also be applied in solution, for example, in glacial acetic acid. Although the reaction takes place more slowly the iodization can be effected with elementary or nascent iodine.

Example 2

If the mono iodo derivative prepared, for example, according to Example 1, be subjected to bromination by treating with bromine in ice water, then brom-iodo-aminobenzoyl-diethyl-amino-ethanol is prepared, the salts of which are somewhat more difficultly soluble than those of the mono-iodo-derivative, but which can scarcely be distinguished in habit and activity from the dibromo derivative.

In an exactly similar manner is effected the halogenation of the (N-methyl-, N-ethyl)-amino-benzoyl-dimethyl (piperidino, furoyl)-amino-ethanol (propanol, isobutanol).

Example 3

A solution of 7.9 parts of 2-nitro-4-iodo-benzoyl chloride in 20 parts of benzene is added to 3 parts of diethyl-amino-ethanol in 10 parts of benzene and the mixture boiled under reflux until the separation of crystals is complete. The 2-nitro-4-iodo benzoic acid-diethyl-amino-ethanol ester hydrochloride is easily soluble in water, difficultly soluble in hydrochloric acid, exhibits the melting point 168° C. and precipitates the base as an oil by the addition of alkali. By treatment with tin or stannous chloride and hydrochloric acid is obtained therefrom the hydrochloride of 2-amino-4-iodo benzoic acid diethyl amino ethanol ester of the formula:

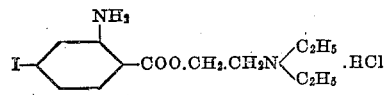

The compound which melts at 205° C. and crystallizes from alcohol in almost colourless scales is insoluble in inert solvents and about 1% soluble in water. The neutral tartrate melts at 63° C. (from alcohol, ether) and is very easily soluble in water. The same compound is produced by the treatment of 4-iodo-2-nitro-benzoyl-β-chlor-ethanol (manufactured from 4-iodo-2-nitro-benzoyl chloride and ethylene chlorhydrin) with diethylamine and subsequent reduction.

By the application of piperidine instead of diethyl-amine the 2-amino-4-iodo benzoic acid piperidine ethanol ester is obtained of formula:—

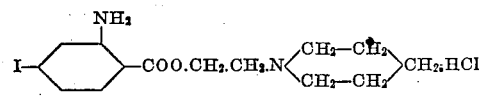

Example 4

10 parts of 3-iodo-4-amino-benzoic acid methyl ester are boiled under reflux with 30 parts of diethyl-amino-ethanol for 15 hours. Thereupon the excess alcohol is distilled off in vacuum, the residue exactly neutralized with hydrochloric acid, the hydrochloric acid solution extracted with ether and from the hydrochloric acid solution after concentration the 3-iodo-4-amino-benzoic acid diethyl-amino-ethanol hydrochloride obtained by salting out. The hydrochloric acid salt forms when recrystallized from absolute alcohol needles which melt at 176° C. and are fairly soluble in water and insoluble in ether and benzene.

Example 5

4 parts of 3-iodo-4-amino-benzoic acid and 10 parts of diethyl-amino-ethanol are treated with concentrated hydrochloric acid. The oily contents of the flask are poured on ice and the unchanged 3-iodo-4-amino-benzoic acid is filtered off. Thereupon the filtrate rendered alkaline is extracted with ethyl acetate. The ethyl acetate solution is dried and after distilling off the ethyl acetate the excess of diethyl-amino ethyl alcohol is distilled off in vacuum. The remaining residue is converted into the hydrochloric acid salt by neutralization with hydrochloric acid and the 3-iodo-4-amino-benzoic acid diethyl-amino-ethanol hydrochloride is purified by crystallization with alcohol and ether. The same compound is obtained by decomposition of the silver salt of 3-iodo-4-amino-benzoic acid with β-diethyl-amino-ethyl-halogenide hydrohalogenide.

Example 6

4-iodo-3-nitro benzoic acid, obtainable from 4-aminobenzoic acid by diazotizing and treating with potassium iodide and nitrating the resulting 4-iodo-benzoic acid, is converted by boiling with thionylchloride into the 4-iodo-3-nitrobenzoic acid chloride. This 4-iodo-3-nitrobenzoic acid chloride is dissolved in 15 parts dried benzene and heated under reflux on the steam bath with the equimolecular quantity of diethylaminoethanol. The 4-iodo-3-nitrobenzoic acid-diethylaminoethanol hydrochloride separates out, which recrystallized from diluted hydrochloric acid or alcohol melts at 198° C.

50 g. of the 4-iodo-3-nitrobenzoic acid diethylaminoethanol hydrochloride are dissolved in 500 ccm. hydrochloric acid, to this solution are successively added 50 g. tin foils under stirring and cooling below 5° C. The tin double salt of the 4-iodo-3-aminobenzoic acid diethylaminoethanolhydrochloride separates out, which is sucked off and washed with concentrated hydrochloric acid. There are obtained 75 g. of the tin double salt. The tin double salt is dissolved in 1,6 litres water and the tin is removed with sulfuretted hydrogen. The filtrate is made alkaline with soda, and the 4-iodo-3-aminobenzoic acid diethylaminoethanol is extracted with acetic ether. The 4-iodo-3-aminobenzoic acid diethylaminoethanol corresponds to the formula

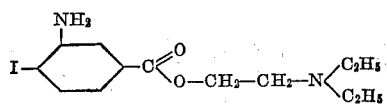

it is insoluble in water, soluble in most organic solvents, with acids it forms colourless crystallized salts which are soluble in water, insoluble in organic solvents. The neutral sulfate melts at 163° C. and is readily soluble in water.

Various changes may be made in the details disclosed in the foregoing specification without departing from the invention or sacrificing the advantages thereof.

We claim:—

1. As new products the salts of the halogen-substituted aminobenzoic acid alkaminesters corresponding to the formula

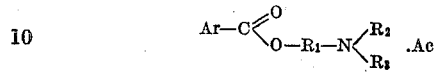

wherein Ar is an amino- and halogen substituted benzene nucleus containing at least one atom of iodine, $R_1$ a bivalent alkylene radical, while $R_2$ and $R_3$ are monovalent alkylradicals or form together with the nitrogen atom a cyclic system, and Ac is an equivalent of an acid which substances form colourless crystals, and are practically insoluble in ether, benzene, chloroform, more easily soluble in alcohol and water.

2. As new products the salts of the halogen-substituted aminobenzoicacidalkamine-ethanolesters of the formula:

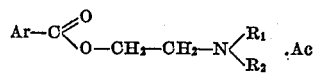

wherein Ar is an amino- and halogen substituted benzene nucleus containing at least one atom of iodine, and $R_1$ and $R_2$ are monovalent alkylradicals or form together with the nitrogen atom a cyclic system, while Ac is an acid equivalent, which substances form colourless crystals and are practically insoluble in ether, benzene, chloroform, more easily soluble in alcohol and water.

3. As a new product the sulfate of 4-iodo-3-aminobenzoic acid diethylaminoethanol corresponding to the formula:

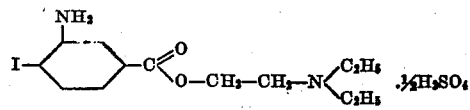

which forms colourless watersoluble crystals melting at 163° C.

WALTER SCHOELLER.
HANS GEORG ALLARDT.